United States Patent [19]

Fortuin et al.

[11] Patent Number: 4,957,627
[45] Date of Patent: Sep. 18, 1990

[54] PROCESS FOR LIQUID-SOLID CONTACT

[75] Inventors: Johannes M. H. Fortuin, Sittard; Johannes C. Göebel, Hoofddorp; Antonius J. F. Simons, Geleen, all of Netherlands

[73] Assignee: Stamicarbon B. V., Geleen, Netherlands

[21] Appl. No.: 334,558

[22] Filed: Apr. 7, 1989

Related U.S. Application Data

[63] Continuation of Ser. No. 101,526, Sep. 28, 1987, abandoned.

[30] Foreign Application Priority Data

Sep. 27, 1986 [NL] Netherlands ............... 8602447

[51] Int. Cl.$^5$ ............................................. B01D 15/02
[52] U.S. Cl. ..................................... 210/679; 210/268
[58] Field of Search ............... 210/660, 661, 675, 676, 210/189, 268, 679; 422/140, 145

[56] References Cited

U.S. PATENT DOCUMENTS 2,742,381 4/1956 Weiss et al. ..................... 210/661

Primary Examiner—Ivars Cintins
Attorney, Agent, or Firm—Cushman, Darby & Cushman

[57] ABSTRACT

Process for contacting a particulate solid phase and a liquid in a column, which solid phase and liquid interact with each other, in which process the column is filled with packing material that is inert in respect of the solid phase and the liquid, in that the solid phase and the liquid are contacted countercurrently, and in that the liquid is subjected to pulsation.

6 Claims, 1 Drawing Sheet

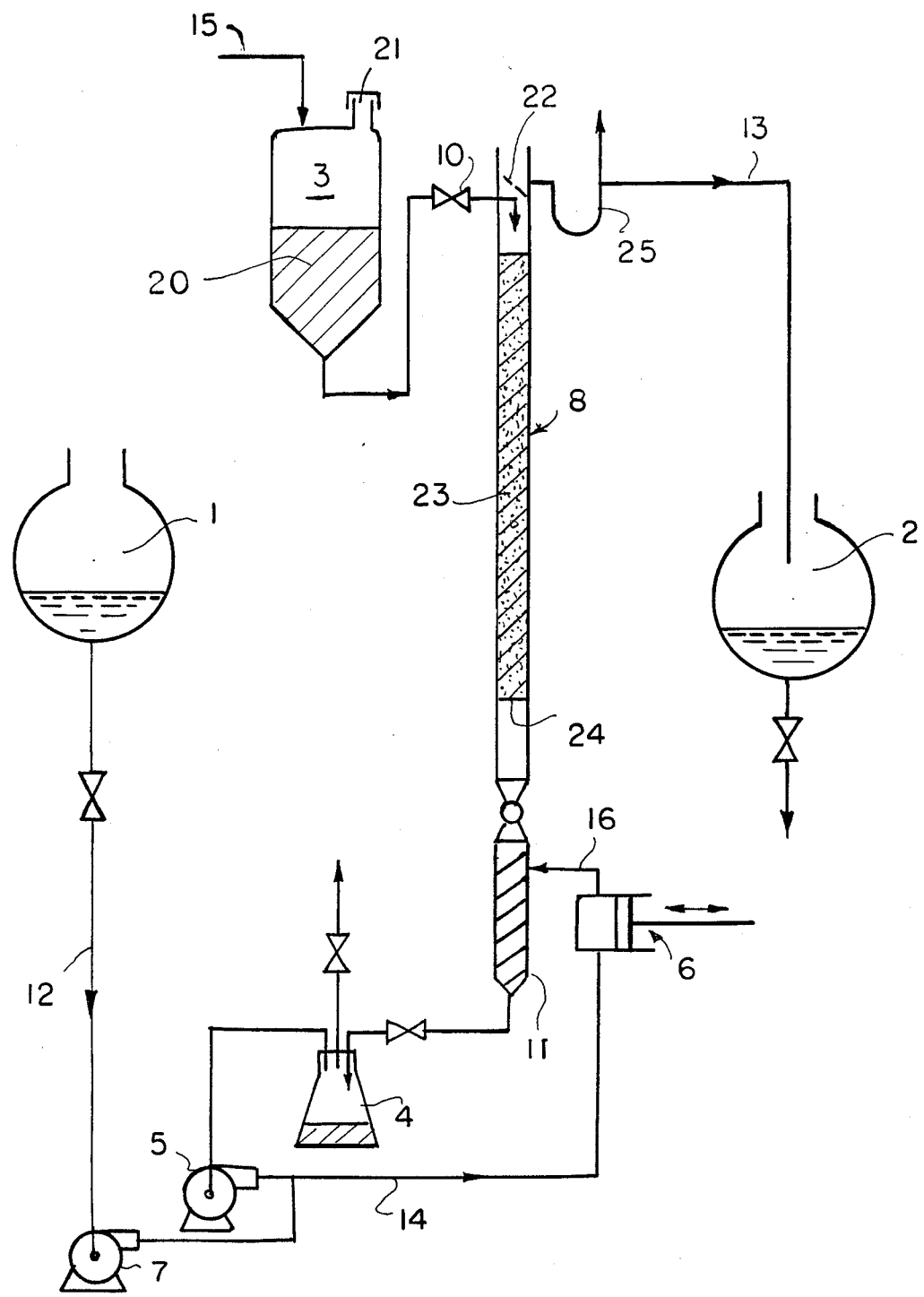

PROCESS FOR LIQUID-SOLID CONTACT

This is a continuation of application Ser. No. 07/101,526, filed 9/28/87, now abandoned.

The invention relates to a process for contacting a particulate solid phase and a liquid in a column, which solid phase and liquid interact with each other.

Such a process is known from Perry's Chemical Engineer's Handbook, 6th edt. 1985, p. 19–50. In this process a liquid and a particulate solid phase are contacted in a column, which is divided into cylindrical compartments by means of a large number of equispaced horizontal plates. The solid phase is intermittently transported from one compartment to the compartment directly below by means of rotating, radial blades, mounted on a rotating central axis. The realization of this process requires a column of rather complex internal design, which is subject to mechanical and other forms of wear. In addition, such a process cannot be scaled up in an unambiguous manner.

As examples of other processes in which a liquid and a particulate solid phase are contacted and interact which each other, processes employing a packed, a fluidized or a moving bed can be mentioned.

The disadvantage of such processes is that there is a large amount of, often expensive, solid phase per volume of the column. In addition, such columns often have to be operated intermittently to enable the solid phase to be replaced, as a result of which the process cannot be carried out continuously and the results are less constant.

These and other disadvantages of the known processes for contacting a particulate solid phase and a liquid can be avoided by applying a process according to the invention, characterized in that the column is filled with packing material that is inert in respect of the solid phase and the liquid, in that the solid phase and the liquid are contacted countercurrently, and in that the liquid is subjected to pulsation.

The use of a column filled with inert packing material only, leads to a reasonable interaction between the two phases, but the axial dispersion leaves to be desired, and also it causes a rather large number of blockages, because the solid phase is deposited on the packing, thus resulting in channeling of the solid phase. In addition, the required uniform radial exchange is not obtained. There is no unambiguous scaling-up rule for such a process either.

The use of an unpacked column only, in which pulsations are generated in the liquid contents of the column, does not prevent channeling of the solid phase and the liquid and therefore results in much undesired axial dispersion.

BRIEF DESCRIPTION OF THE DRAWINGS

FIG. 1 shows a schematic view of the equipment used according to the present invention, as follows:

1 Liquid storage vessel (20 l)
2 Storage vessel (20 l) of liquid phase
3 Storage vessel (10 l) of solid phase feed, completely filled with liquid and sedimented solids
4 Storage vessel (2.5 l) of solid discharge
5 Metering pump for controlling the solids discharge (maximum volume flow rate: $10.10^{-6}$ m$^3$s$^{-1}$)
6 Pulsator
7 Liquid-phase feed pump
8 Pulsed packed column
10 Inlet of solid particles
11 Outlet of solid particles
12 Inlet of continuous liquid phase
13 Outlet of continuous liquid phase
14 Recirculation, free of solid particles
15 Liquid inlet
16 Combination of flow 12 and 14
20 Sedimented solid particles
21 Solid particles inlet
22 Solid particles screen
23 Column packing (Raschig rings)
24 Packing support
25 Adjustable overflow of column By using a column packed with inert material which is also provided with means generating pulsations in the liquid contents of the column, and contacting the particulate solid phase and the liquid countercurrently, a continuous process is obtained for contact of a liquid and a particulate solid phase, which effects good interaction, that is, mass-and/or heat-transfer between the solid phase and the liquid. This transfer is even several times greater than that realized in processes not employing a pulsation. Uniform radial exchange and only slight axial mixing is effected, which means that a substantially ideal countercurrent situation is obtained. In addition, there are fewer interfering blockages in the column (these blockages are removed or at least reduced considerably by the pulsation).

For inert packing material both dumped-type packing (e.g. the so-called Raschig rings) and arranged-type packing (e.g. Sulzer Mellapack, as described in Chemical Engineering Progress, Nov. 1977, pp. 71–77) may be used. It is preferred that the bed porosity, defined as the volume of the interstitial space per unit of volume of the packed part of the column is at least 0.40, in particular at least 0.50. Bed porosities as high as 095 and 0.98 also give good results. The presence of the packing limits the movement of the solid phase, as a result of which the effective (which may also be referred to as superficial) velocity of the solid phase and of the liquid is allowed to be greater than in the case of an unpacked column. Also, differences in density between the particulate solid phase and the liquid of for instance 100–700 kg/m$^3$ can readily be applied in a process according to the invention.

The pulsation of the liquid contents of the column results in a higher degree of local turbulence of the contents of the column. Preferably a pulsation rate, s * f, of $10^{-3}$ to $10^{-1}$ m/s is used, the pulsation rate being defined as the product of the stroke s (in m), which is the distance over which the liquid is transported through the column at each pulse or the quotient of the volume of the liquid transported in each pulse and the cross-sectional area of the (empty) column, and the pulsation frequency f (in s$^{-1}$). Practical values for f are: 0.5–5 (s$^{-1}$) and for s: $10^{-3}$–5 * $10^{-2}$ m. The pulsation can be effected by means of e.g. a pulsator, known in a general form from liquid-liquid extraction. Reference can be made to e.g. the article in Chem. Ing. Techn. 48(5) 487 ff (1976), as well as to NL-B-170.371, NL-B-166.762 and US-A-3.719.204, which describe special embodiments of pulsators.

In applying a process according to the invention, there is, in comparison with processes employing a column filled with the solid phase as packing material (packed bed, nonpulsed), only a small amount of solid phase present in the column, of which a large part is used in the solid-liquid contact.

The choice of the particle size of the solid phase depends, on the one hand, on the geometry of the column and the type of packing to be used and, on the other, on the contact efficiency of the liquid and the solid phase aimed at. The size of the solid phase particles is therefore preferably $10^{-5}$ to $10^{-2}$ m, in particular $10^{-4}$–$5 * 10^{-3}$ m. If the solid phase particles are too large, the contact surface will be too small; if the particles are too small the effective velocity will be too small, which results in too large a solid phase holdup or insufficient column efficiency. The installation required for contacting the given amounts of liquid and solid phase would then be too large. In addition, as the particles of the solid phase become larger, the risk of the passage through the column becoming blocked increases and it becomes increasingly difficult to avoid this by means of pulsation. The above depends on the effective velocity of the solid phase, which, in turn, is partly determined by the difference in density between the solid phase and the liquid, the particle size of the solid phase and the effective velocity of the liquid. The particle size distribution is preferably small, for example with a standard deviation of less than 10%, in particular less than 5%.

The process according to the invention is applicable to any process requiring intimate contact of a liquid and a solid phase. The process is therefore applicable to processes in which certain components are to be removed from a liquid with the help of a solid phase. Examples are the purification of waste water with the help of active carbon, the removal of heavy metals, acids or bases with the help of an ion exchanger, but also the selective absorption of certain components present in the liquid phase, like amino acids from a mixture of amino acids, penicillin from the penicillin preparation liquid, as well as continuous liquid chromatographic separations.

The process is therefore also applicable to processes in which certain components are removed from a solid phase with the help of a liquid. Examples are the extraction of valuable components from solid natural products. In addition, the process can be applied for coating or washing a solid phase, as well as for transporting the solid phase from contaminated liquid to a pure liquid, for example in the recovery of solid polymer from the reaction liquid obtained from the polymer preparation.

The process according to the invention is further applicable to chemical reactions in a liquid to be effected in a column, whether or not in the presence of catalytic material. The solid phase can then be used to absorb one or more reaction products and thus remove them from the process.

It has been found that the use of a pulsed, packed column for countercurrently contacting a liquid and a solid phase according to the invention presents a scaling-up factor of 1, which means that, in increasing the process flow rates, the diameter of the enlarged column may simply be chosen such that the cross-sectional area of this column equals that of a combination of several smaller columns of the same length. In other words, the length of the column is independent of its cross-sectional area for a desired effect. In this manner investigations and results with a small laboratory column can be translated directly to a larger (semi-)commercial column. This is an important advantage over the known processes for liquid-solid contact, in which the enlargement of the cross-sectional area makes an enlargement of the length of the column necessary for the same effect to be obtained.

The invention is further explained with reference to the following examples and comparative experiments, without, however being limited thereto.

In the following examples use is made of an arrangement as illustrated in FIG. 1.

EXAMPLE 1

An aqueous solution of potassium hydroxide with a pH of 11.7 is led upwards through a vertical glass extraction column (E 8) (height 4 m, inside diameter 5 cm), packed with glass Raschig rings (G 4) (length 1 cm, diameter 1 cm, bed porosity 0.62), at an effective liquid velocity of 3.03 mm/s. The liquid in the column is pulsed with the help of a piston with bellows (E 6) with a frequency (f) of 1.6 Hz and a superficial stroke (s) of 7.4 mm (s.f.=12 mm/s). A flow of ion exchange particles (F1) (Fluka IR120 in acid form, mean particle diameter 0.6 mm) is fed down the column at a superficial velocity of 0.11 mm/s. The solid is introduced in the form of a dense slurry in demineralized water, according to a principle described in the literature (B. A. Bennett, F. L. D. Cloete, A. I. Miller and M. Straet, Chem. Eng. (London) 1969, CE 241). The indicator thymolphthalein is added to the liquid. A change in colour of the liquid phase, at a distance of approx. 84 cm from the bottom of the packing, indicates that the potassium hydroxide and the acid ion exchanger have reacted to such an extent, that the pH has dropped to below the pH at which the indicator changes colour (9.5).

EXAMPLE 2

Example 1 is repeated with the difference that the pulse frequency is reduced to 1.26 Hz and the effective stroke to 3.5 mm (s.f.=4.4 mm/s). A change in colour is observed at a distance of 166 cm from the bottom of the packing.

COMPARATIVE EXAMPLE

Example 1 is repeated, however, without pulsing. A change in colour is now observed at a distance of approx. 177 cm from the bottom of the packing. In addition, accumulations of the solid phase are now clearly visible between the packing.

Examples 1 and 2 and the comparative example show that by applying sufficiently intensive pulsing, the same degree of neutralization of the liquid can be obtained in a considerably shorter column.

EXAMPLE 3

Example 1 is repeated, however, now in a glass column with an inside diameter of 15 cm, under otherwise equal conditions. A change of colour is now observed at a distance of 87 cm from the bottom of the packing.

Example 3 shows that the diameter of the column has no significant effect on the length of the column required for obtaining a certain degree of neutralization.

EXAMPLE 4

A flow of demineralized water is forced upwards through the arrangement described in example 1, at an effective velocity of 3.03 mm/s. The liquid in the column is once again pulsated with a frequency of 1.6 Hz and an effective stroke of 7.4 mm. A flow of porous active carbon particles with a diameter of 0.5 mm is supplied from the top, at an effective velocity of 0.11 mm/s. The carbon particles are introduced in the manner described above, as a dense slurry in an aqueous solution of 1 mol/l sodium chloride. Conductivity measurements of the liquid surrounding the carbon particles leaving the column showed that the latter were free of sodium chloride. This example shows that the process is suitable for transferring a solid phase, present in a contaminated liquid phase, to a pure liquid phase.

We claim:

1. A process for contacting:
   (1) a particulate solid phase, and
   (2) a liquid phase
   in a column which comprises
   providing at least a zone in said column filled with inert packing material, and
   effecting countercurrent flow and contact between said solid phase and said liquid phase within said packed zone, wherein said solid phase and said liquid phase pass through said packing material, while
   pulsating said liquid phase in said packed zone of said column to induce local turbulence therein, whereby said solid phase and said liquid phase interact with each other within said zone.

2. Process of claim 1, wherein said interaction effects purification of said liquid phase.

3. Process of claim 1, wherein said interaction effects purification of said particulate solid phase.

4. Process of claim 1, wherein said interaction effects separation of one or more liquid components from the liquid phase.

5. Process of claim 1, wherein said interaction effects a chemical reaction in the liquid phase, wherein the particulate solid phase absorbs one or more reaction products.

6. Process of claim 5, wherein said interaction effects a chemical reaction in the liquid phase in the presence of catalytic material.

* * * * *